Dec. 12, 1933.  E. P. BURRELL  1,939,102
HYDRAULIC OPERATING SYSTEM FOR MACHINE TOOLS
Filed Jan. 24, 1931  6 Sheets-Sheet 4
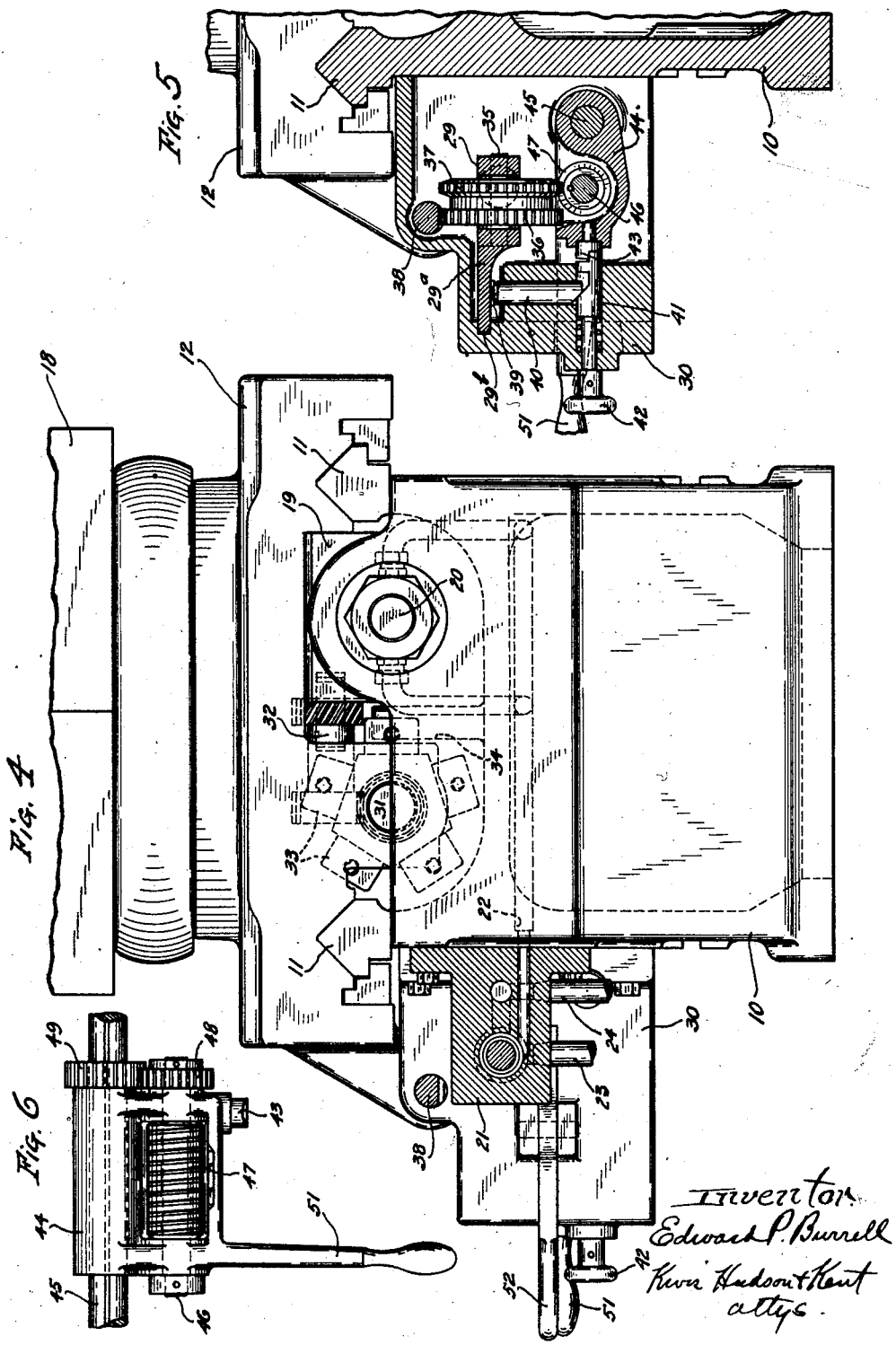

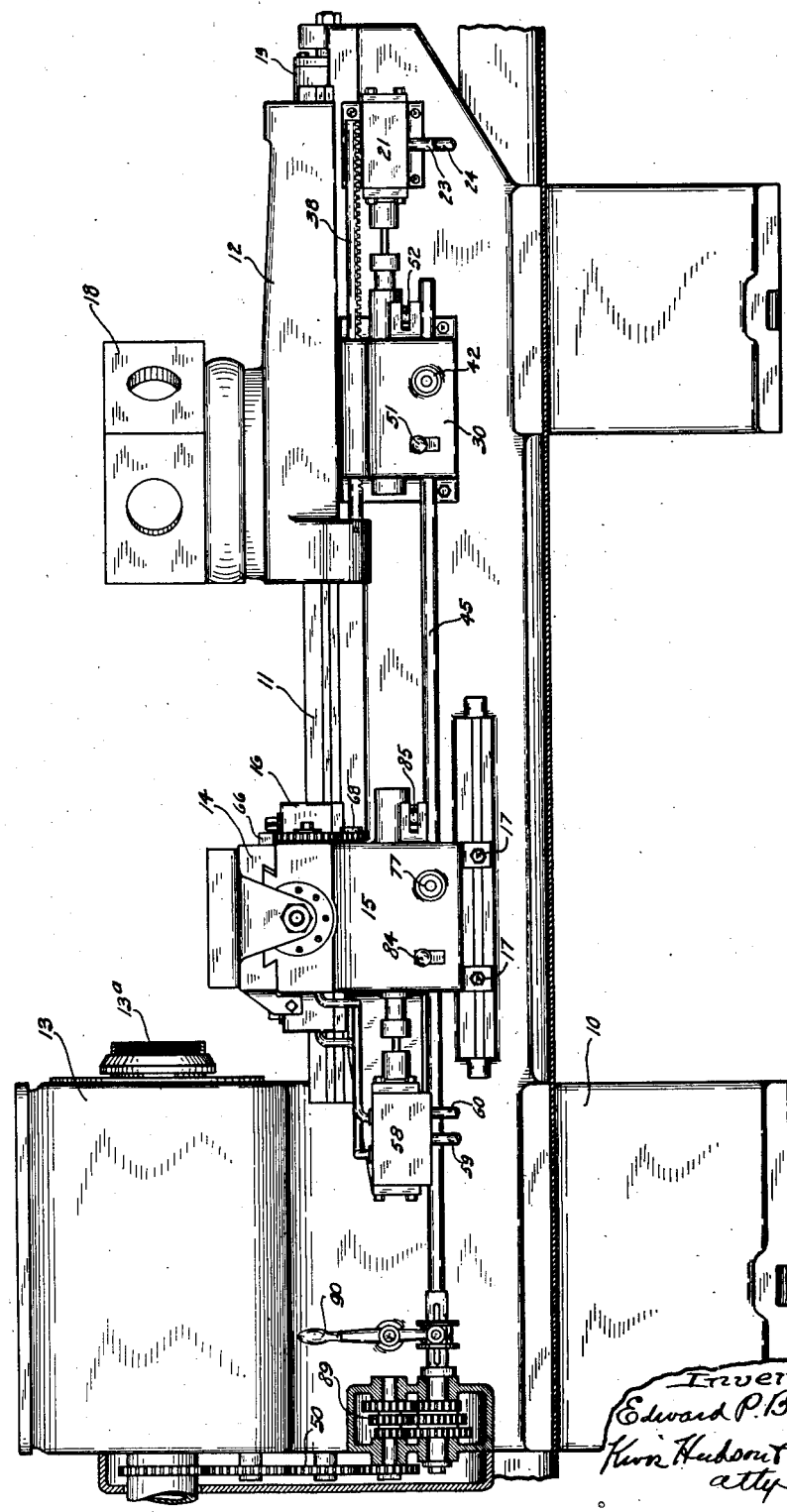

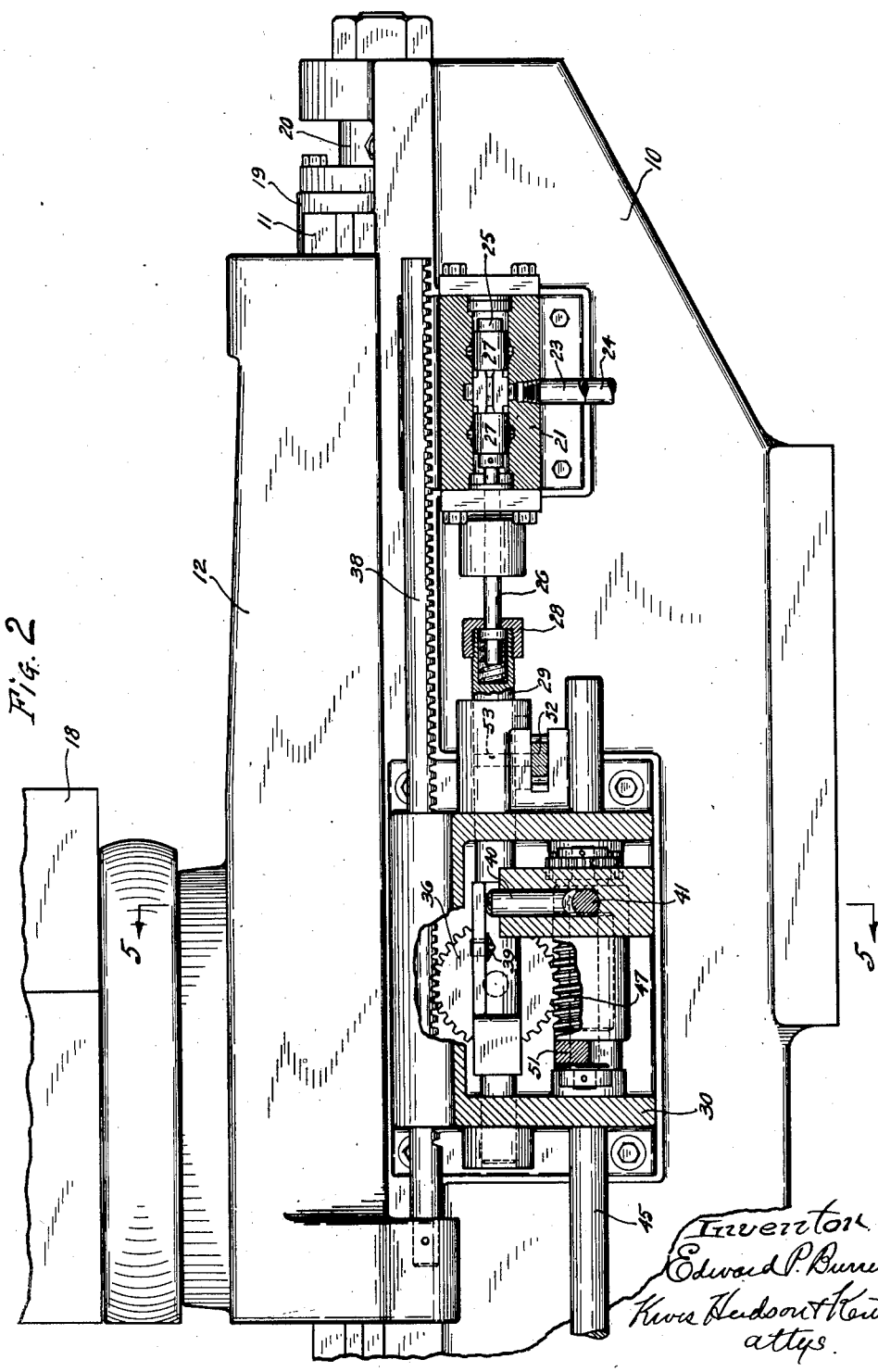

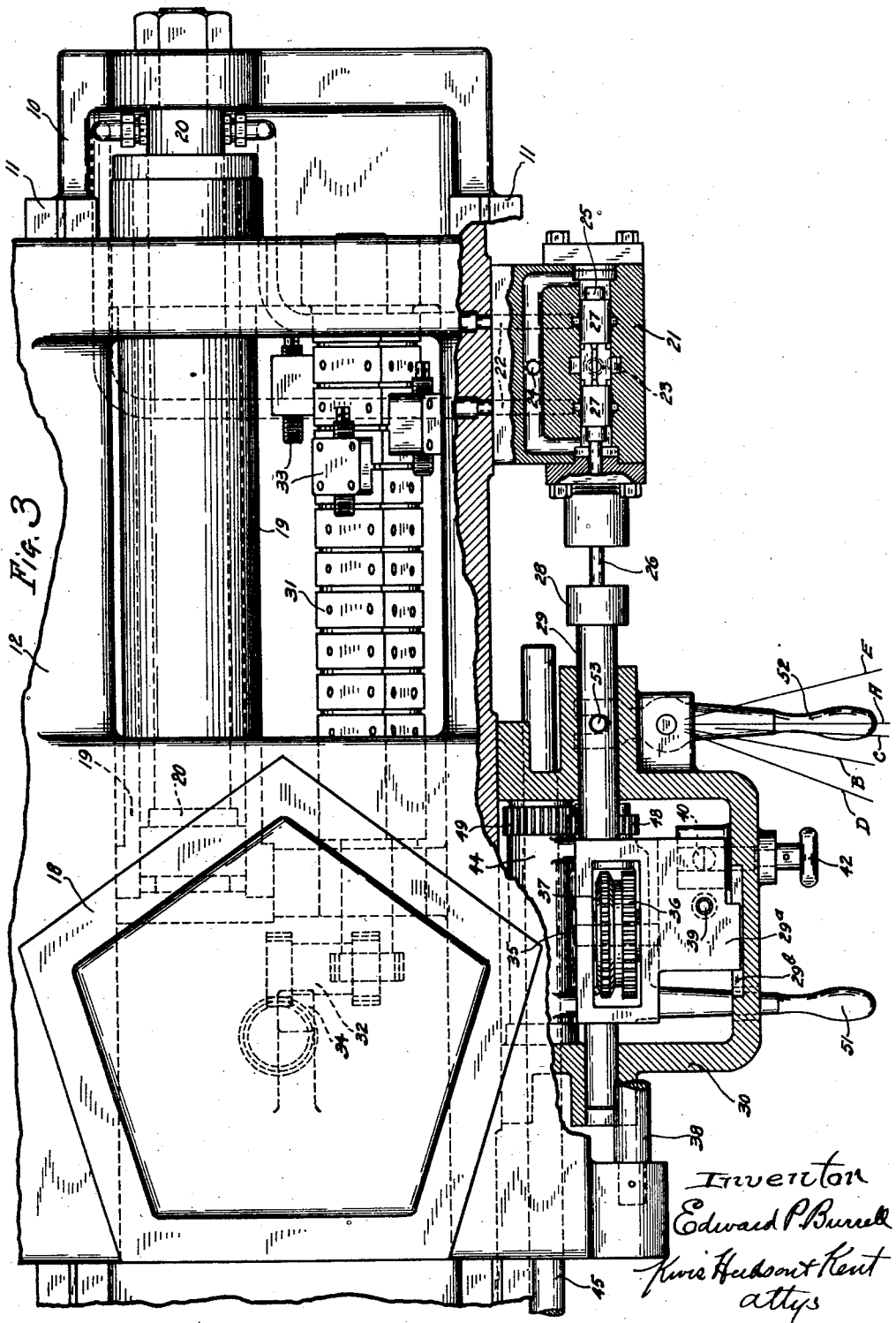

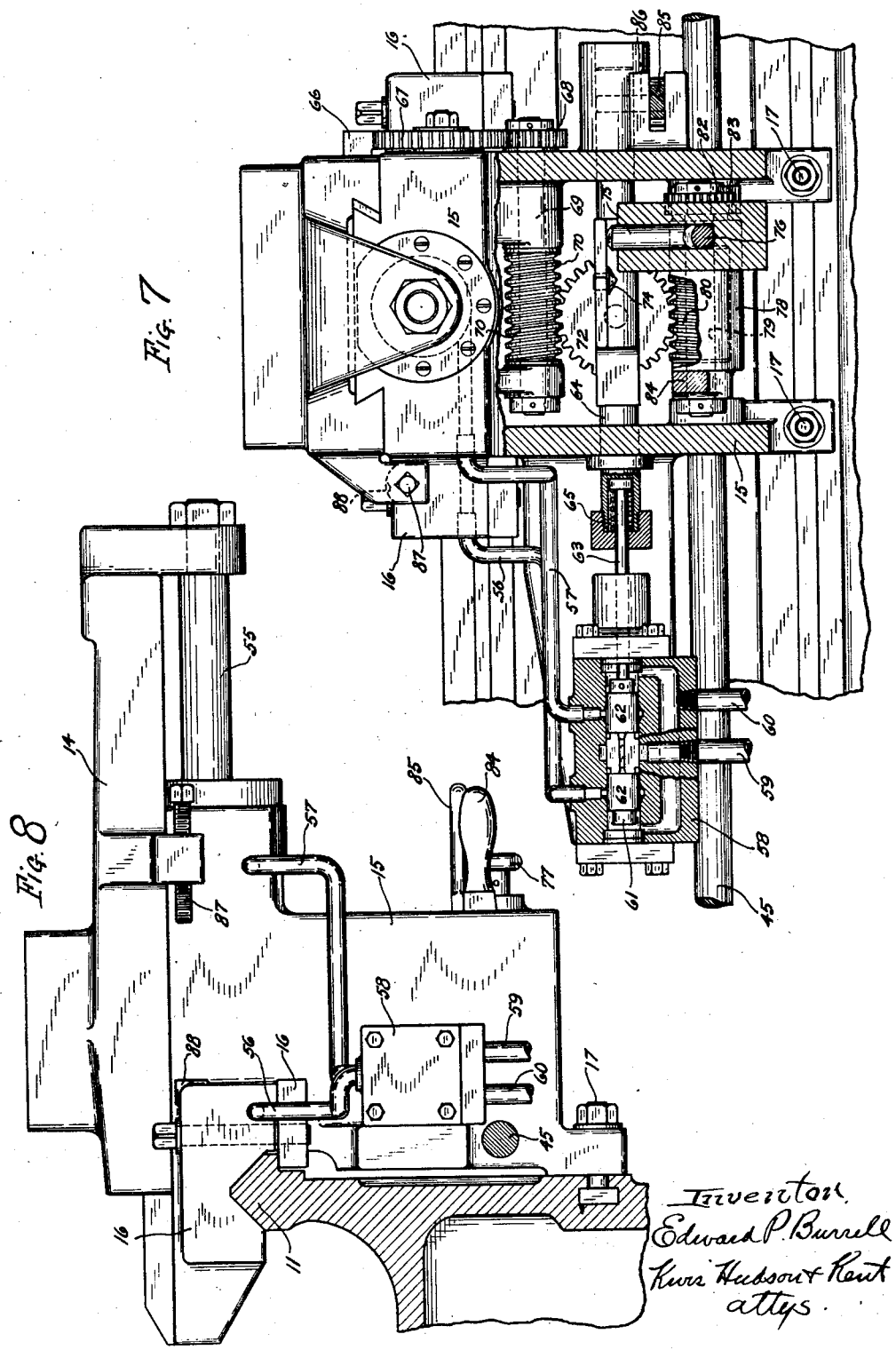

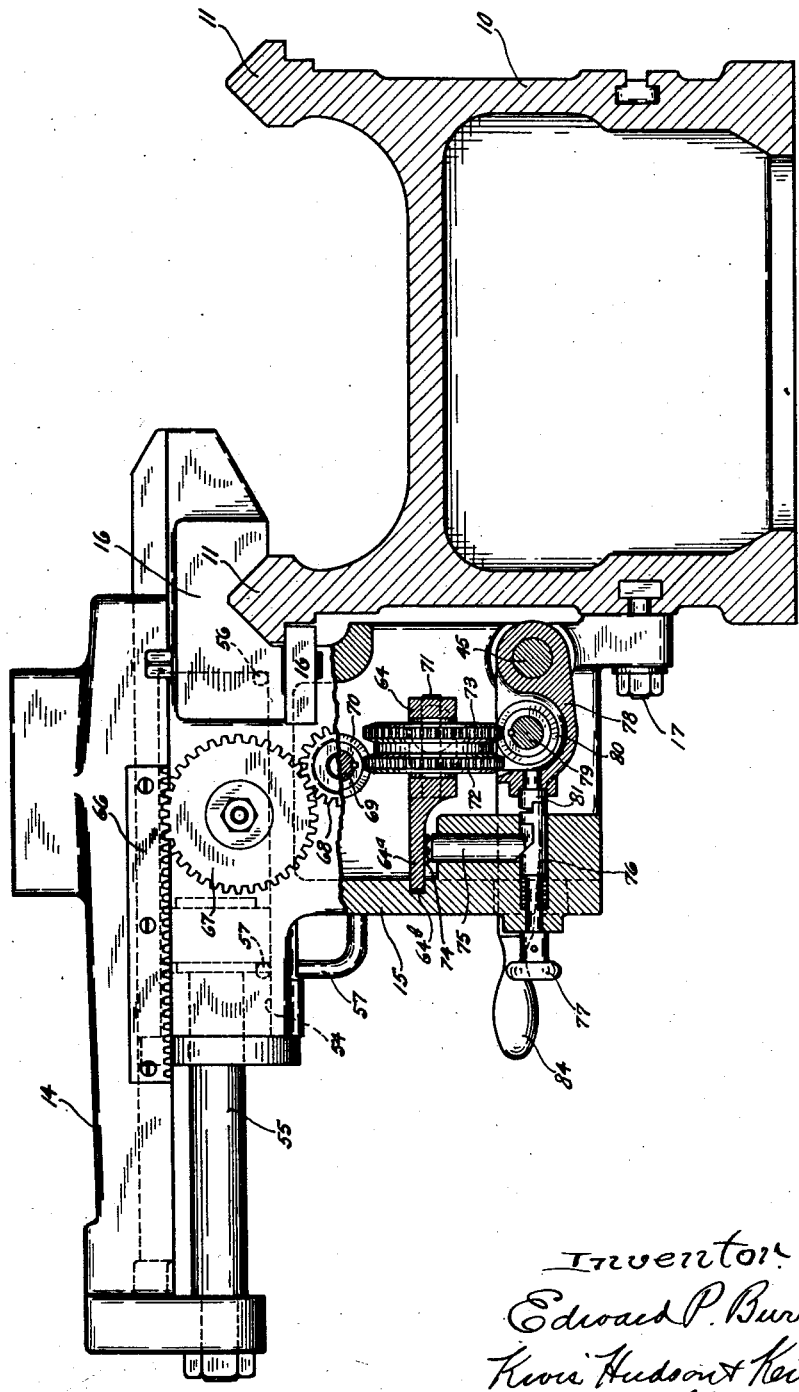

Patented Dec. 12, 1933

1,939,102

UNITED STATES PATENT OFFICE 1,939,102

HYDRAULIC OPERATING SYSTEM FOR MACHINE TOOLS

Edward P. Burrell, Shaker Heights, Ohio, assignor to The Warner & Swasey Company, Cleveland, Ohio, a corporation of Ohio Application January 24, 1931. Serial No. 510,996

13 Claims. (Cl. 29—42)

This invention relates to a hydraulic control system for machine tools and more particularly to a hydraulic operating system for machine tools having movable members whose rates of movement are to be accurately controlled.

The invention finds particular utility in connection with machine tools, such as lathes and the like, wherein the movable members are a tool or a work holding slide movable in opposite directions along the ways of the bed, or a cross-slide movable transversely of the ways of the bed in opposite directions, or both of such movable members. The movable members are usually given an advancing or forward movement, then a feeding movement, and then a return movement.

The principal object of the present invention is to provide in a machine tool an improved hydraulic actuating system for the movable members, including control means for insuring constant movement of said members during the feeding movement thereof regardless of the variable leakage factor in the hydraulic system or other factors which might tend to cause irregular movements.

A further object is to provide an improved hydraulic actuating system for the movable members of a machine tool, including control valves for said members and means for automatically controlling such valves during the feeding movements of the said members to regulate the rates of such movements.

A still further object is to provide an improved hydraulic actuating system for the movable members of a machine tool including valves for regulating the movement of said members and means for automatically controlling said valves and operated by a common drive shaft.

The above and other objects are attained by the present invention which may be here briefly summarized as consisting in certain novel combinations and arrangements of parts and details of construction which will be described in the specification and set forth in the appended claims.

My control system may be used to advantage with many different kinds of machine tools, but a particularly important field of use includes machine tools having a reciprocating tool or work holding member movable along the ways of the bed and a cross-slide reciprocating transversely of the ways of the bed, such members usually being given a relatively slow feeding movement which must be of a constant nature regardless of leakage in the hydraulic system and regardless of varying pressures on the members. Accordingly, I have illustrated my invention applied to such a machine tool, with the hydraulically actuated members being in this instance a turret slide and a cross-slide, but it is to be understood that in so illustrating the invention I do not limit any part or all of the novel features to a machine tool of this type or to the turret and cross-slides, since it might be applied to other sliding members which have relative movement with respect to other portions or members of the machine.

The control device and the valve for the turret slide are illustrated herein as arranged on a fixed part of the machine, such as the bed, while the control device and the valve for the cross-slide are illustrated as arranged on the cross-slide carriage which is adjustably mounted or clamped in fixed positions on the bed, but it should be understood that these control devices and valves may be carried by movable parts of the machine, such as the slides.

In the accompanying drawings,

Figure 1 is a side elevation of a turret lathe equipped with my invention, certain parts of the lathe being shown in section;

Fig. 2 is a fragmentary side elevation, on an enlarged scale, of the rear portion of the lathe as viewed in Fig. 1, certain of the parts thereof being shown in section;

Fig. 3 is a top plan view of the portion of the lathe shown in Fig. 2, certain portions of the lathe being shown in section;

Fig. 4 is an end elevational view, partly in section, and showing a portion of the machine on an enlarged scale, taken from the righthand side of Fig. 1;

Fig. 5 is a sectional view taken on line 5—5 of Fig. 2, looking in the direction of the arrows;

Fig. 6 is a detail view of a portion of the control means;

Fig. 7 is an enlarged side elevational view of the cross-slide portion of the lathe, as shown in Fig. 1, certain parts being indicated in section;

Fig. 8 is an end elevation of the cross-slide portion of the lathe looking from the lefthand side of Fig. 7; and Fig. 9 is an end elevation similar to Fig. 8 but taken from the righthand side of Fig. 7.

Referring now to the drawings, the machine tool or lathe herein illustrated is provided with a bed 10 having ways 11 on which one of the hydraulically actuated sliding members, in this instance in the form of a tool supporting turret slide 12, is mounted, this slide being movable toward and from the relatively stationary head 13 of the lathe in which is rotatably mounted the work spindle 13ª. In some cases the work piece is supported in the sliding member and the tool or tools in the member which is relatively stationary in so far as longitudinal movement is concerned, and of course the invention is equally applicable to that type of machine tool.

The cross-slide 14 is mounted upon the cross-slide carriage 15 which is adjustably supported upon the ways 11 of the bed, as clearly shown in Figs. 8 and 9. The cross-slide carriage 15 is clamped in this instance to the front way 11 of the bed, as illustrated herein, by means of clamp members 16 and T-head bolts 17 arranged in a T-slot in the side of the bed. It should be understood that although only one cross-slide and cross-slide carriage are illustrated herein, another cross-slide and cross-slide carriage might be supported upon the rear way 11 of the bed 10.

In a machine of the type herein illustrated, provided with a turret slide 12 having a tool holding turret 18, the tools are adapted to be mounted on the several faces of the turret, as is well understood in the art, the tools being caused to successively operate on the work, and each cycle of movement including a forward movement of the slide to bring the tool adjacent the work, then a relatively slow feeding movement for the cutting operation, then the stopping of the slide, followed by a predetermined dwell of the tool at the completion of the cut, and a return movement back to the point where the cycle is to be repeated. The turret is indexed before the commencement of each forward movement of the slide so as to properly position the tool or tools which are supported on the next or adjacent face of the turret and which operate during the next cycle of operation, as is well understood.

In lathes of the character illustrated herein, the cross-slide carriage is adjusted on the way of the bed and clamped thereon in the proper position with respect to the head of the lathe and the forwardmost position of the turret slide. One or more tools are clamped to the cross-slide and the latter is given a reciprocating movement transversely of the ways of the bed in such manner as to bring the tools clamped thereon into and out of cutting position either during the forward movement of the turret slide or between such forward movements thereof to effect a combined cutting action of the tools carried by both slides or an alternating cutting action thereof.

Many of the parts of the lathe may be of standard construction. For example, the indexing mechanism for the turret may be any of the usual standard forms employed in the customary mechanically operated turret lathe, wherein the turret indexing takes place automatically during the latter portion of the return movement of the turret slide or manually when the slide has reached its most rearward position. As these are standard in machines of this kind, they are not herein illustrated.

As previously stated, the turret slide 12 of the machine is moved hydraulically back and forth over the ways 11, and by this it meant, of course, by means of a hydraulic motor comprising a suitable relatively movable cylinder 19 and piston 20 (see Fig. 3) and suitable actuating fluid, generally a special oil, which is supplied through a valve under pressure in this instance to either side of the piston by a suitable pump (not shown) and having the usual form of relief valve. The cylinder 19 and the piston and piston rod 20 which actuate the turret slide 12 are mounted in the bed 10 (see Figs. 3 and 4). For convenience, the cylinder 19 it attached in any suitable manner to the lower side of the turret slide and the piston and piston rod are stationary, Figs. 2 and 3 showing the end of the piston rod 20 as suitably secured in the rear end of the bed 10. The actuating fluid is supplied to the cylinder 19 on opposite sides of the piston, as is well known in the art, through the medium of a control valve 21 connected to passage 22 forming, during different portions of the operative cycle, inlet and outlet passages for the motive fluid of the hydraulic motor. The valve 21 is also connected to the pump by an inlet passage 23 and an outlet passage 24, as is well understood. The valve 21 consists of a valve housing in which a cylindrical bore, constituting a valve chamber, is formed for the movable valve member 25, the ends of the bore being closed by suitable end plates, one of which is provided with a stuffing box in which is slidably arranged a valve rod 26. The movable valve member 25 is slidable endwise in the bore of the valve chamber and is shown as having two cylindrical portions 27. These cylindrical portions are connected by a reduced skeleton portion and are adapted to cover and uncover ports in the cylinder bore of the valve chamber which ports communicate with the delivery and exhaust passageways 22. The valve member has connected to it the valve rod 26 which, as previously mentioned, extends through the stuffing box on the end of the valve housing and is connected in this instance by a lost motion connection 28 to the end of the control slide 29 of a control unit including a housing 30 which is, in this instance, bolted or otherwise secured to the bed 10 forwardly of the valve 21 and adjacent thereto. It is customary, in turret lathes, to provide a so-called stop-roll with a series of adjustable stops thereon to positively stop the forward movement of the turret slide at the completion of the cutting operation. This stop-roll is usually in the form of a polygonal drum having as many faces as there are faces on the turret and the stops for the different cycles of movement of the slide are secured to the different flat faces of the stop roll. In this instance, I use the usual stop-roll, the same being illustrated in Figs. 3 and 4 at 31, this stop-roll being supported by and movable with the slide 12. The stop-roll is connected with the turret by any suitable gearing 32 indicated in Figs. 3 and 4 so that the roll will be given a step-by-step rotation each time the turret is indexed. The stops which are adjustably mounted on the roll are shown at 33, one of these stops at the end of each forward movement of the slide coming into contact with a suitable fixed stop indicated at 34, the fixed stop 34 being integral with or secured to the bed 10.

Referring again to the control mechanism arranged in the housing 30, it will be noted that the valve rod 26 is connected to the control slide 29 which is slidably supported for horizontal movement in the housing 30. The slide 29 has cylindrical portions at its opposite ends and intermediate these portions is provided with an outwardly extending portion 29ᵃ in the form of a tongue entering a groove 29ᵇ in the outer wall of the housing 30 (see Fig. 5) to maintain the slide 29 in the proper position and to prevent turning or rotation thereof. The forwardly extending portion 29ᵃ of the slide is provided with an opening within which is mounted upon a bearing pin 35 a gear unit including a spur gear 36 and a worm wheel 37 integrally or otherwise united for rotation together. The spur gear 36 meshes with an elongated rack 38 suitably connected to a projecting arm formed on the slide 12 so as to move with the slide (see Figs. 2 and 3). The forwardly projecting portion 29a of the slide 29 is provided on its under side with a camming dog 39 arranged to engage with the end of a camming plunger 40 slidably carried in the housing 30. The opposite end of the plunger 40 engages a catch pin 41 with a camming action so that when the plunger 40 is depressed the catch pin 41 will be moved outwardly against spring pressure. The catch pin 41 is provided with an outwardly extending portion projecting through the front wall of the housing 30 and provided at its end with a knob 42. The inner end of this catch pin 41 cooperates with a catch member 43 carried by a bracket 44 pivotally mounted in the housing 30 upon a shaft 45. The bracket 44 has journaled therein a shaft 46 upon which is fixed a worm 47 which meshes with the worm wheel 37 of the gear unit when the bracket is in the position shown in Figs. 2 and 5, at which time the catch member 43 is engaged with the inner end of the catch pin 41 in order that the bracket may be held in this position. A gear 48 is fixed on the shaft 46 (see Fig. 6), and meshes with a gear 49 having a keyed relation with the shaft 45 and located between the bracket 44 and the end wall of the housing 30 (see Fig. 3). It will thus be seen that the bracket 44 is free to rock on the shaft 45 which constitutes its pivotal center without disturbing the intermeshing relationship between the gears 48 and 49 whereby the worm 47 can be constantly driven by the shaft 45. The shaft 45 is connected through suitable gearing, indicated generally at 50, to the work spindle in the head 13 of the machine. It should be understood that the shaft 45 is driven in this manner in predetermined relationship with the spindle in the head for a purpose which will be referred to presently.

A handle 51 is connected to the bracket 44 and extends beyond the front wall of the housing 30 (see Figs. 1, 3 and 5) for the purpose of swinging the bracket to bring the worm 47 into mesh with the worm wheel 37. It will thus be seen that when the catch pin 41 is pulled outwardly manually by the knob 42, or through the action of the dog 39 and camming plunger 40, the inner end of the catch pin 41 will be disengaged from the catch pin 43 carried by the bracket and the bracket will swing downwardly and the worm 47 will be disengaged from the worm wheel 37. When the worm 47 is disengaged from the worm wheel 37, the gear unit, of which the worm wheel is an element, will be rotated idly by movement of the rack 38 which meshes with the gear 36 of the unit, in which event the control slide 29 is free to be shifted manually by the lever 52 (see Figs. 1, 3 and 4), the control slide 29 being provided with a downwardly extending pin 53 engaging the forked inner end of the lever 52. It will be understood, of course, that the shifting of the control slide 29 moves the valve member 25 since this member is connected to the control slide by means of the valve rod 26 and therefore the valve can be manually shifted by means of the lever 52.

As previously stated, the cross-slide carriage 15 is adjustably supported upon the front way 11 of the bed, while the cross-slide 14 is mounted on the carriage for movement transversely of the ways of the bed. This movement of the cross-slide is obtained by means of a hydraulic motor including a cylinder 54 in the cross-slide carriage 15 and a piston and piston rod 55 operating in said cylinder and connected to the cross-slide. It should be understood, however, that this arrangement can readily be reversed and the cylinder arranged in the cross-slide and the piston and piston rod 55 connected to the cross-slide carriage, such an arrangement being similar to that shown in connection with the turret slide. Passageways 56 and 57 enter the cylinder 54 adjacent opposite ends thereof so as to cause the pressure fluid to operate on opposite sides of the piston and thus move the cross-slide in either direction. The passages 56 and 57 extend to a valve 58 mounted on an extension at an end of the cross-slide carriage 15. It will be understood that the passages 56 and 57 will alternately act as inlet and exhaust passages, depending upon the direction of movement given to the cross-slide. Passages 59 and 60 enter the valve 58 and form, respectively, inlet and exhaust passages connecting the valve with a source of pressure fluid supply. The inlet and exhaust passages 59 and 60 may be connected to enter the valve 58 and form, respectively, inlet and exhaust passages of the valve 21 for the turret slide, or they may be connected to a different pump and relief valve. The valve 58 is substantially the same as the valve 21 previously described and includes a movable valve member 61 having two cylindrical portions 62 and a valve rod 63 extending through an end plate of the housing of the valve 58 and connected to a control slide 64 by a lost motion connection indicated at 65. It might be stated at this time that although the valve 58 is substantially the same as the valve 21, the passages connecting the valve with the source of pressure fluid supply and with the hydraulic motor for the cross-slide are differently arranged for the purpose of providing clearance between them and certain parts of the lathe.

The cross-slide 14 has secured thereto a rack 66 the teeth of which mesh with an idler gear 67 mounted upon a bearing pin extending from an end of the cross-slide carriage 15, as clearly shown in Figs. 7 and 9. The teeth of the idler gear 67 mesh with a spur gear 68 fixed on a rotatable shaft 69 mounted in suitable bearings formed in the cross-slide carriage. A worm 70 is fixed on the shaft 69 intermediate the bearings therefor, such worm corresponding in function to the rack 38 of the control unit for the turret slide. It will be seen that since the rack 66 is connected to the cross-slide so as to move therewith and is in geared relation with the shaft 69, the movement of the cross-slide will rotate the worm 70 in different directions according to the direction of movement of the cross-slide and that therefore this worm corresponds to the rack 38 carried by the turret slide, as previously mentioned. The control slide 64 is substantially the same as the control slide 29 and has an outwardly extending portion 64a the end of which engages in a groove 64b formed in the outer wall of the cross-slide carriage. A gear unit is carried by the control slide 64, being mounted in an opening in the slide on a pin 71 and comprising two worm wheels 72 and 73, the worm wheel 72 corresponding to the spur gear 36 and the worm wheel 73 exactly corresponding to the worm wheel 37 of the gear unit mounted in the control slide 29. The forwardly extending portion 64a of the control slide 64 is provided on its under side with a camming dog 74 corresponding to the camming dog 39, which dog, during the movement of the control slide 64, is arranged to contact with the upper end of a slidable plunger 75, the lower end of which has a camming relation with a catch pin 76 and corresponds to the catch pin 41 in the control unit for the turret slide. The plunger 75 when moved downwardly will retract the catch pin 76 against the tension of a suitable spring, the catch pin having an outwardly extending portion projecting through the front wall of the cross-slide carriage and upon which is a knob 77 providing for manual retraction of the catch pin. A bracket 78, identical with the bracket 44, is mounted for rocking movement upon the shaft 45, which shaft, as has been previously explained, is rotated by and in timed relation with the spindle in the head 13 through the intermediary of the gearing indicated generally at 50. The bracket 78 has journaled therein a shaft 79 upon which is fixed a worm 80 which meshes with a worm wheel 73 of the gear unit when the bracket is in the position shown in Fig. 9, at which time a catch member 81 carried on the forward side of the bracket is engaged with the inner end of the catch pin 76 in order that the bracket may be held in this position. A gear 82 is fixed on the shaft 79 and meshes with a gear 83 having a keyed relation with the shaft 45 between the bracket 78 and the end wall of the cross-slide carriage 15. This construction is identical with that shown in Fig. 6, the gears 82 and 83 corresponding to the gears 48 and 49 shown in said view. The bracket 78 has an outwardly extending handle 84 corresponding to the handle 51 and by means of which the bracket may be rocked to bring the worm 80 into engagement with the worm wheel 73, the bracket dropping by gravity when the catch pin 76 is disengaged from the catch 81 and thereby moving the worm 80 out of mesh with the worm wheel 73. A handle 85, corresponding to the handle 52 and similarly mounted upon an end of the cross-slide carriage, has its inner forked end engaging a pin 86 projecting from the under side of the control slide 64 so that the control slide may be manually moved when the worm 80 is disengaged from the worm wheel to control the movement of the cross-slide. The cross-slide 14 carries an adjustable abutment screw 87 arranged to abut against an abutment 88 mounted on the cross-slide carriage, the purpose of these parts being to arrest the forward movement of the slide similar to the stops 33 on the roll 31 and the stop 34 on the bed, such arresting of the forward movement of the slide permitting the differential action of the control unit to occur, as will be explained in the description of the operation of the lathe which is to follow.

The shaft 45 which operates both control units and is driven from the spindle in the head 13 by the gearing 50 may be given different rates of rotation by means of change speed gearing to provide different rates of feeding movement for the slides. In the present embodiment, the shaft 45 is illustrated as having three different rates of rotation obtainable through the change speed cones designated generally at 89 and controlled by the lever 90 which may clutch any of the gears of the cones to the shaft 45 by means of a sliding key or similar device.

When the center line of the lever 52 lies in the position A (see Fig. 3), the valve 31 is in neutral position, and since the lever 85 and the valve and the control mechanism associated therewith are the same as the corresponding elements for the turret slide, the positions of the levers 52 and 85 and their movements are the same, and therefore it will only be necessary to describe the movements of the lever 52, it being borne in mind that corresponding movements are given to the lever 85. When the levers are in neutral position, the inlet and exhaust passageways to the hydraulic motors for the turret and cross-slides will be closed by the cylindrical portions of the movable valve members and there will be no flow of fluid in the system to and from the cylinders of the motors and the slides will both be at rest. In order to bring the turret slide into cutting position for the tool, lever 52 is moved until its center line is substantially in the position B, as shown in Fig. 3, and the valve has been shifted to allow the motive fluid to flow therethrough and into the cylinder 19 in the proper manner to effect such movement. The lever 85 may likewise be moved to cause the cross-slide to move transversely of the ways of the bed into cutting position. As soon as the tool or tools on the turret slide have reached their cutting position, the worm 47 is engaged with the worm wheel 37 by means of the lever 50 to start the automatic movement of the control slide 29 and movable valve member 25, as will be presently explained, while the lever 85 may be similarly moved to bring the worm 80 into mesh with the worm wheel 73 and thus effect the automatic movement of the control slide 64 and movable valve member 61 to control the rate of feeding movement of the cross-slide. When the worms in each control unit are engaged with their respective worm wheels, the levers 52 and 85 will be automatically moved by the control slides 29 and 64 respectively so that the center lines of the levers lie substantially along the lines C (see Fig. 3). The movement of the control slides 29 and 64 shift the valves to the feeding position and a differential action will automatically take place during the feeding movement of the tool slide and cross-slide in which the port openings of the valves for the incoming and exhausted fluids will be controlled. Since the worms 47 and 80 are now in mesh with the worm wheels 37 and 73 of the gear units carried by the slides 29 and 64 respectively, it will be seen that the rate of movement of the main slide 12 and cross-slide 14 controls the movement of the control slides 29 and 64, with the result that the movable valve members 25 and 61 are automatically positioned or oscillated to control the amount of incoming and exhausted fluid passing therethrough required for the desired constant rates of feeding movement of the slides. In the case of the main or turret slide 12, the movement of the rack 38 and gear 36 controls the movement of the slide 29 while in the case of the cross-slide the movement of the rack 66, worm 70 and worm wheel 72 controls the movement of the control slide 64.

If the rate of movement of the main or turret slide 12 with the rack 38 and gear 36 carried by the control slide 29 is the same as the worm 47 which is driven in timed relation with the spindle in the head, there will be no movement of the control slide 29 and the valve will be stationary in its proper position. However, as soon as there is a difference in the rate of movement between the slide 12 and gear 36 and the worm 47, the control slide 29 will be moved automatically to change the position of the valve and thus increase or diminish the uncovered portions of the ports for the passageways in the valve housing, thus varying the amount of fluid passing through the valve to maintain the constant feeding movement of the main slide, disregarding any leakage of fluid or other factors which might make such rate of movement variable. In the same way, if the rate of movement of the cross-slide 14 with the rack 66 carried by the slide, the worm 70 arranged in the cross-slide carriage and the worm wheel 72 is the same as the worm 80 which is also driven in timed relation with the spindle in the head through shaft 45, there will be no movement of the control slide 64 and the movable valve member 61 will be stationary in its proper position.

However, as soon as there is a difference in the rate of movement between the cross-slide 14 and the worm 70 and worm 80, the control slide 64 will be moved automatically to change the position of the movable valve member 61 and thus increase or diminish the port openings to control the amount of fluid passing through the valve and to maintain the constant feeding movement of the cross-slide.

Upon the completion of the feeding movement of the main or turret slide 12, one of the stops 33 carried by the stop roll 31 will abut the stop 34 arranged on the bed and thus positively arrest the movement of the main slide, while the abutment screw 87 carried by the cross-slide 14 will abut the abutment 88 on the cross-slide carriage and thus positively stop further movement of the cross-slide. The movement of the slides having been arrested, a differential in the rate of movement of the parts of the respective control units will be created. In the case of the control unit for the turret slide, there will be a differential in the rate of movement of the gear 36 and worm 47, with the result that the control slide 29 will be moved to the right, as viewed in Fig. 2, and the camming dog 39 will contact with the upper end of the camming plunger 40 to depress the same and retract the catch pin 41, thus disengaging the inner end of the catch pin from the catch member 43 carried by the bracket 44 and allowing said bracket to swing downwardly and move the worm 47 out of engagement with the worm wheel 37.

In the case of the control unit for the cross-slide, there will be a differential in the rate of movement of the worm wheel 72 and worm 80, with the result that the control slide 64 will be moved so as to bring the camming dog 74 into contact with the upper end of the camming plunger 75 to depress the same and retract the catch pin 76, thus disengaging the inner end of the catch pin from the catch member 81 carried by the bracket 78 and allowing said bracket to swing downwardly and move the worm 80 out of engagement with the worm wheel 73.

It will thus be noted that both control units are substantially the same and that the differential action provided for therein functions in substantially the same manner. These movements of the control slides 29 and 64 first move the movable valve members 25 and 61 to their forward position in which position the righthand end of each valve abuts the righthand end of each valve housing. The movement of the control slides 29 and 64 continue after the valves have been moved to this position, and during these further movements of the control slides, the springs in the lost motion connections 28 and 65 are compressed and the action of the camming dogs 39 and 74 upon the camming plungers 40 and 75 take place to disengage the worms 47 and 80 from the worm wheels 37 and 73. It will be seen that from the time that the movements of the slides 12 and 14 are stopped until the worms 47 and 80 have been disengaged from the worm wheels 37 and 73, a period of dwell will be created, during which time the tool or tools carried by the slides will be relieved of any spring and the cut finished. When the worms 47 and 80 have been disengaged, the levers 52 and 85 will be substantially in the position indicated by the center line D (see Fig. 3) and due to the action of the springs of the lost motion connections 28 and 65, the control slides and levers will be moved automatically so that both levers will be substantially in the position indicated by the center line B.

Now in order to effect the return movement of the slides, the operator moves the control levers 52 and 85 substantially to the position indicated by the center line E in Fig. 3, thus shifting the movable valve members 25 and 61 to the proper position to reverse the flow of motive fluid to the hydraulic motors to thereby return the slides to their original positions. When the slides have reached their original positions, the operator may move the levers 52 and 85 to the neutral position indicated by the center line A in Fig. 3 to stop the operation or movement of both slides or he may move these levers to the forward position indicated by the center line B to initiate a new cycle of operation.

Although the operation of the machine has been described in connection with the simultaneous operation of both the turret slide 12 and the cross-slide 14, it should be understood that these slides may be separately operated according to the nature of the work being performed by the machine, as, for example, the turret may be first brought into cutting position and started on its feeding movement, while during this feeding movement of the turret slide the cross-slide may be brought to its cutting position and its feeding movement commenced.

As previously set forth, a second cross-slide and cross-slide carriage may be supported upon the rear way 11 of the bed, and such additional cross-slide operated in the same manner as the cross-slide 14, the control unit for this third slide being operated also by the shaft 45 which is rotated in timed relation with the spindle in the head 13.

It will thus be seen that the rate of feeding movement of the two or the three slides can be regulated by valves in turn controlled by control units operated from a single power shaft driven in timed relation with the spindle in the head of the machine. It will also be seen that the rate of rotation of this common power shaft can be varied by means of the change speed gearing in the gear train between such shaft and the spindle in the head.

While I have shown one form of my invention, the same being applied to a lathe, it will be understood that the mechanism may be modified in many particulars and that it may be applied to other types of machine tools than turret lathes. I therefore aim in my claims to cover all modifications and adaptations which do not involve a departure from the spirit and scope of the invention.

Having thus described my invention, I claim:

1. In a machine tool, a movable member and a plurality of hydraulically moved members, and means for controlling the movements of said hydraulically moved members comprising a control valve for each hydraulically moved member, and differential mechanisms connected with said valves and having elements connected with the hydraulically moved members and with said first mentioned movable member.

2. In a machine tool, a rotatable member and a plurality of slidable members, hydraulic means for moving said slidable members, and means for controlling the movements of said slidable members comprising control valves for each of said members, and differential mechanisms connected to said valves and having elements connected to the slidable members and to the rotary member.

3. In a machine tool, a rotatable member and a plurality of slidable members, hydraulic means for operating said slidable members, control valves for said slidable members, a power shaft operated by said rotatable member, and control mechanisms connected to said valves and each having elements connecting said slidable members and said power shaft with a differential action.

4. In a machine tool, a rotatable member and a plurality of slidable members, hydraulic means for moving said slidable members, a control valve for each of said slidable members, a power shaft driven by said rotatable member, and means for connecting each of said slidable members with its valve and with said power shaft comprising a differential mechanism including gear members connected to the slidable members and to said power shaft to control said valves and regulate the movements of said slidable members.

5. In a machine tool, a head having a rotatable spindle therein, a bed, a slide movable longitudinally of the bed, a cross-slide moving transversely of the bed, hydraulic means for actuating said slides, valves for controlling said means, separate means for automatically regulating said valves and operatively connected with said slides to control the rates of movement thereof, and a common operating shaft associated with said spindle and operating each of said separate control means.

6. In a machine tool, a head having a rotatable member, a bed, a cross-slide moving transversely of said bed, hydraulic means for actuating said slide, a valve for controlling said means to regulate the rate of movement of said slide, a control mechanism for automatically controlling said valve, and means connected to said rotatable member and said slide for operating said control mechanism.

7. In a machine tool, two movable members, hydraulic means for moving one of said members, and means for controlling the movement of the hydraulically moved member comprising a valve and a differential mechanism including a plurality of worms connected with both movable members and said valve.

8. In a machine tool having two movable members, hydraulic means for moving one of said members, and means for controlling the movement of the hydraulically moved member comprising a valve and a differential mechanism connected to said valve and including a worm operatively associated with the hydraulically moved member and a worm operatively associated with the other movable member.

9. A machine tool having two movable members one of which is in the form of a slide, hydraulic means for moving said last mentioned member relative to the other member, and means for controlling the movement of the slide comprising a valve and a differential mechanism connected to said valve and including a worm operatively associated with the slide and a worm operatively associated with the other of said movable members.

10. A machine tool having a rotary member and a slidable member, hydraulic means for moving said slidable member including a control valve, and means for controlling said valve comprising a differential mechanism including a worm operatively associated with said slidable member, a worm operatively associated with said rotary member, and gearing connected with one of said worms and with said valve and adapted to be operatively connected with said other worm.

11. In a machine tool, a movable member and a plurality of hydraulically moved members, valves for each of said hydraulically moved members, separate means for controlling each valve and connected to said hydraulically moved members, a common means for operating said last named means and connected with said first mentioned movable member, and means for varying the speed of said common means.

12. In a machine tool having two movable members, hydraulic means for moving one of said members, a valve for controlling the movement of the hydraulically moved member, and a differential mechanism connected to said valve and including a worm having its axis arranged transversely to the line of movement of said hydraulically moved member, means operatively connecting said hydraulically moved member with said worm, and a worm operatively associated with the other movable member.

13. In a machine tool, a rotatable member and a plurality of slidable members, hydraulic means for moving said slidable members, control valves for each of said slidable members, means operating in timed relation with said rotatable member, and control mechanisms for each of said control valves operatively connected with said slidable members and said last named means whereby said valves are actuated with a differential action.

EDWARD P. BURRELL.